(12) United States Patent
Kimura

(10) Patent No.: US 11,340,469 B2
(45) Date of Patent: May 24, 2022

(54) IMAGE STABILIZING APPARATUS, OPTICAL APPARATUS USING IMAGE STABILIZING APPARATUS, AND DRIVING APPARATUS

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 550 days.

(21) Appl. No.: 16/142,166

(22) Filed: Sep. 26, 2018

(65) Prior Publication Data

US 2019/0094566 A1 Mar. 28, 2019

(30) Foreign Application Priority Data

Sep. 28, 2017 (JP) .............................. JP2017-188267

(51) Int. Cl.
*G02B 27/64* (2006.01)
*G03B 5/00* (2021.01)
*H04N 5/232* (2006.01)

(52) U.S. Cl.
CPC ............. *G02B 27/646* (2013.01); *G03B 5/00* (2013.01); *H04N 5/23209* (2013.01);
(Continued)

(58) Field of Classification Search
CPC ........ G02B 27/64; G02B 27/646; G02B 7/02; G02B 7/023; G03B 5/00;
(Continued)

(56) References Cited

U.S. PATENT DOCUMENTS 9,653,675 B2 * 5/2017 Yamanaka ........... H02N 2/0055
2013/0201392 A1   8/2013 Gutierrez
2014/0293463 A1 * 10/2014 Yamanaka ............. H02N 2/004
                                                       359/824

(Continued)

FOREIGN PATENT DOCUMENTS

CN     101334571 A     12/2008
CN     101925836 A     12/2010
(Continued)

OTHER PUBLICATIONS

The above documents were cited in a Oct. 22, 2020 Chinese Office Action, which is enclosed with an English Translation, that issued in Chinese Patent Application No. 201811138374.4.
(Continued)

*Primary Examiner* — Thong Q Nguyen
(74) *Attorney, Agent, or Firm* — Cowan, Liebowitz & Latman, P.C.

(57) ABSTRACT

An image stabilizing apparatus includes an optical element, a first fixing member, a movable member that holds the optical element, and is movably supported in a flat surface perpendicular to an optical axis, a ball sandwiched between the movable member and the first fixing member, a vibration wave actuator that includes a piezoelectric element and a vibrating plate, and moves the movable member, a slider that contacts the vibrating plate, and is provided in the movable member, a spring that pressurizes the vibrating plate against the slider, and a second fixing member fixed to the first fixing member so as to make the vibrating plate and the slider contact each other with a predetermined pressure.

15 Claims, 11 Drawing Sheets

(52) U.S. Cl.
CPC ..... *H04N 5/23258* (2013.01); *H04N 5/23287* (2013.01); *G03B 2205/0007* (2013.01); *G03B 2205/0038* (2013.01); *G03B 2205/0061* (2013.01)

(58) Field of Classification Search
CPC .... G03B 2205/0007; G03B 2205/0038; G03B 2205/006; H04N 5/23209; H04N 5/23245; H04N 5/23258; H04N 5/23287; H04N 5/2353
USPC .................................. 359/554–557, 813–824
See application file for complete search history.

(56) References Cited

U.S. PATENT DOCUMENTS

| | | | | |
|---|---|---|---|---|
| 2016/0164436 | A1* | 6/2016 | Nishitani | H02N 2/12 359/824 |
| 2017/0046818 | A1* | 2/2017 | Kiyamura | H04N 5/23287 |
| 2018/0288332 | A1* | 10/2018 | Nishitani | H04N 5/23287 |

FOREIGN PATENT DOCUMENTS

| | | |
|---|---|---|
| CN | 103713444 A | 4/2014 |
| CN | 106452167 A | 2/2017 |
| CN | 106950677 A | 7/2017 |
| JP | 2006-330077 A | 12/2006 |
| JP | 2008-220031 A | 9/2008 |
| JP | 2011-158924 A | 8/2011 |
| JP | 2014-142562 A | 8/2014 |
| JP | 2016-092879 A | 5/2016 |
| JP | 2017-037182 A | 2/2017 |
| JP | 2017-107190 A | 6/2017 |

OTHER PUBLICATIONS

The above foreign patent documents were cited in the Jul. 29, 2021 Japanese Office Action, a copy of which is enclosed without an English Translation, that issued in Japanese Patent Application No. 2017-188267.

* cited by examiner

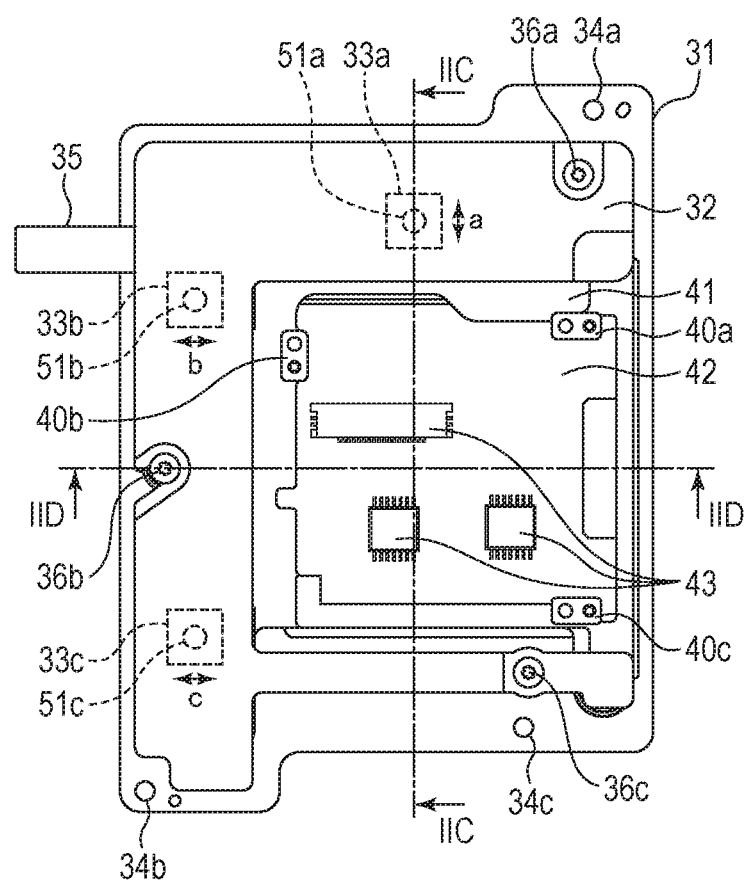
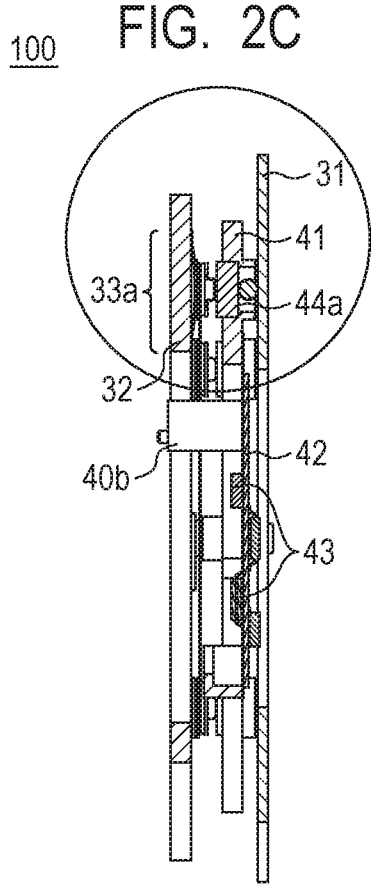
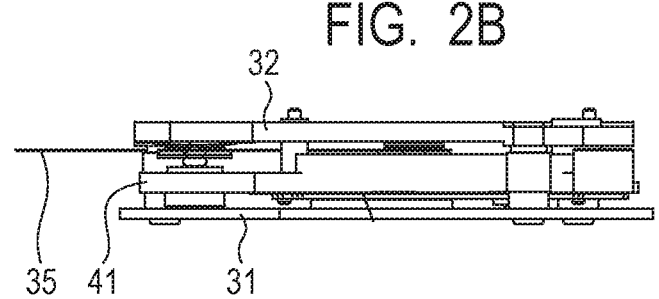
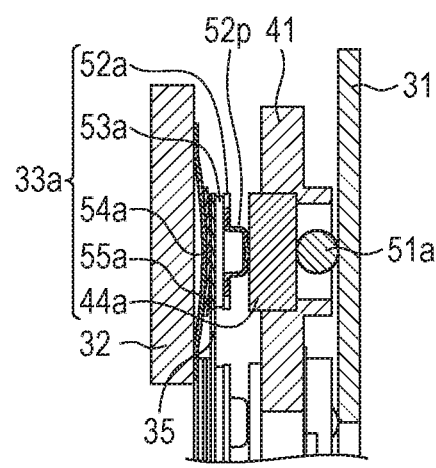
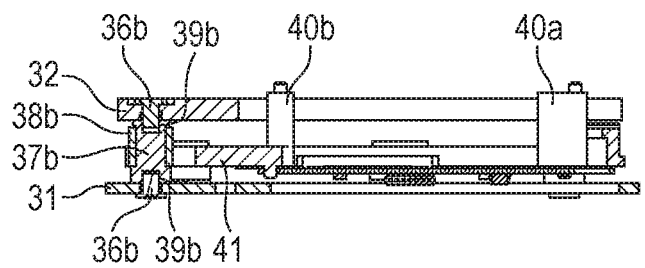

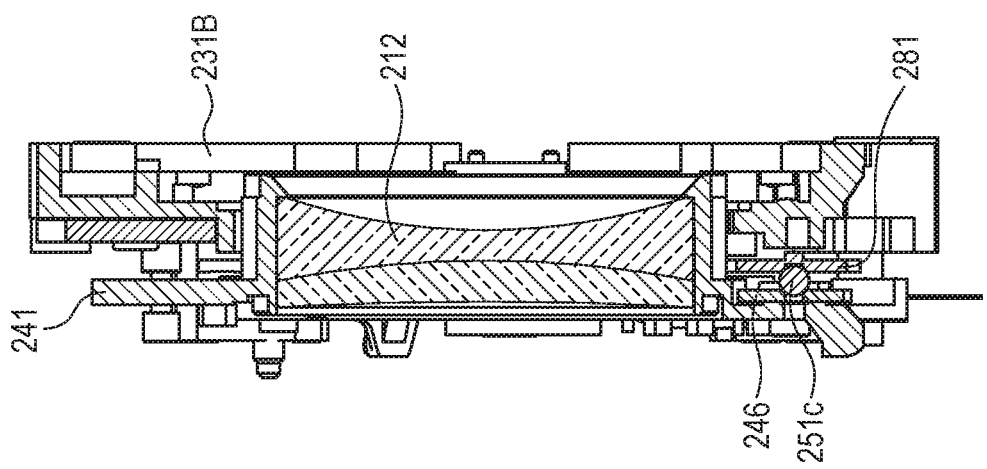
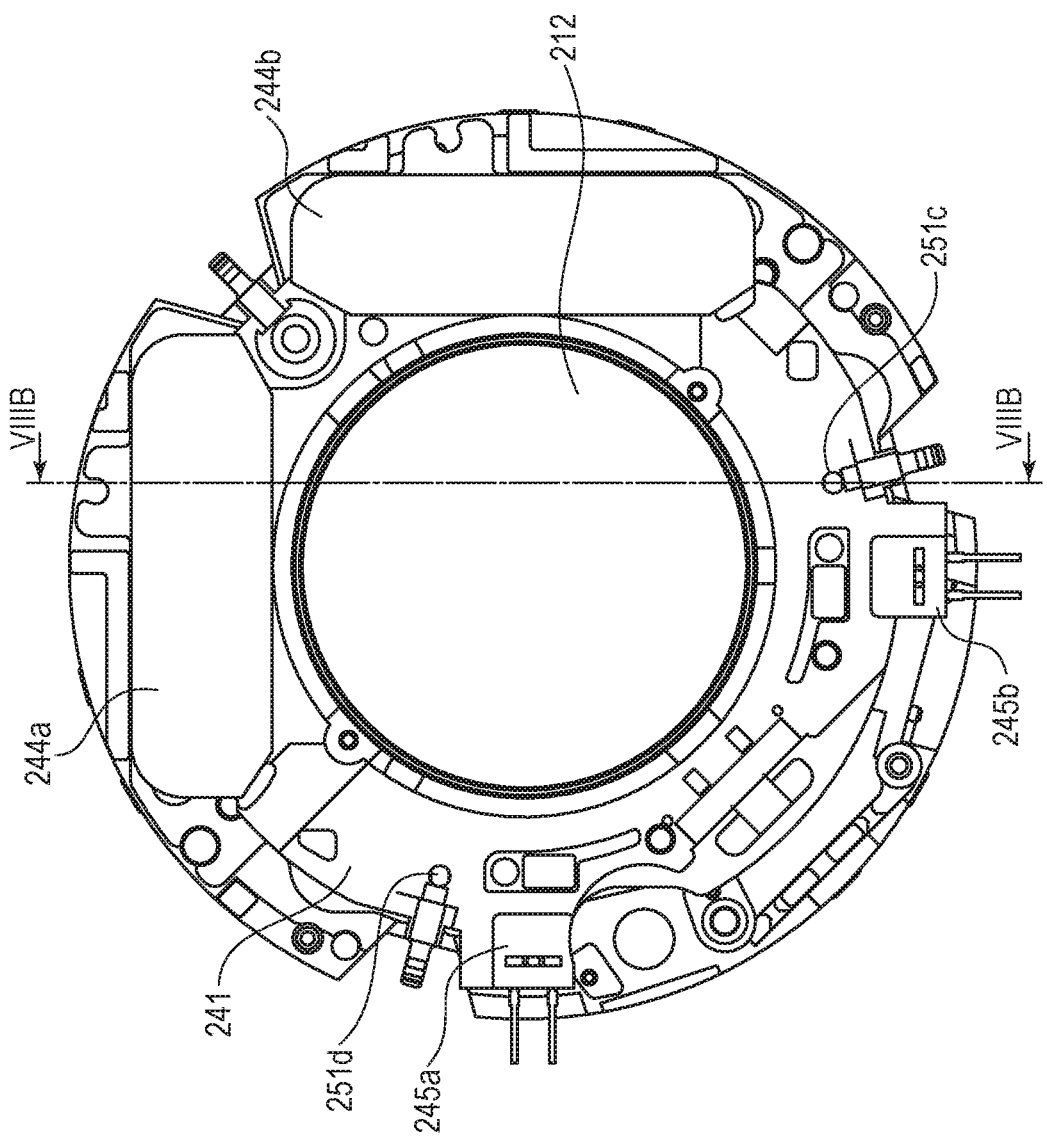

IMAGE STABILIZING APPARATUS, OPTICAL APPARATUS USING IMAGE STABILIZING APPARATUS, AND DRIVING APPARATUS

BACKGROUND OF THE INVENTION

Field of the Invention

The present invention relates to a driving apparatus using a vibration wave actuator.

Description of the Related Art

Recently, the performance of image pickup apparatuses has been improved, and the number of image pickup apparatuses provided with an image stabilization function (a function that enables photographing with a high resolution even with a long exposure time by suppressing camera shake in handheld shooting) is increasing. Additionally, an ultrasonic motor is used in various applications as an actuator that can respond at high speed, and can hold the position of a driving unit. Japanese Patent Application Laid-Open No. 2014-142562 discusses an image stabilizing apparatus that can move in a biaxial direction by using a vibration type driving apparatus for an image stabilizing apparatus, and adopting the mechanism in which a displacement in an axial direction does not affect the other axis. Japanese Patent Application Laid-Open No. 2008-220031 discusses an image stabilizing apparatus that can move in a biaxial direction by using a driving apparatus for an image stabilizing apparatus, and adopting the configuration in which movable units are stacked.

However, in the configuration of Japanese Patent Application Laid-Open No. 2014-142562, there are problems that the configuration is easily affected by backlash due to many components provided between an output unit of a vibration type driving apparatus and a displacement extraction unit for image stabilization, and that the configuration is easily affected by component deflection. In the configuration of Japanese Patent Application Laid-Open No. 2008-220031, in order to provide a mechanism for movement in a Y axis direction on a mechanism for movement in an X axis direction (a stacked configuration), there is a problem that the size of an apparatus is increased.

In view of the above-mentioned problems, an object of the present invention is to provide an image stabilizing apparatus, an optical apparatus using the image stabilizing apparatus, and a driving apparatus that reduce the influence of backlash and the like without increasing their sizes.

SUMMARY OF THE INVENTION

An image stabilizing apparatus of the present invention includes an optical element, a first fixing member, a movable member holding the optical element, and movably supported in a flat surface perpendicular to an optical axis, a ball sandwiched between the movable member and the first fixing member, a vibration wave actuator including a piezoelectric element and a vibrating plate, and moving the movable member, a slider contacting the vibrating plate, and provided in the movable member, a spring pressurizing the vibrating plate against the slider, and a second fixing member fixed to the first fixing member so as to make the vibrating plate and the slider contact each other with a predetermined pressure.

According to the present invention, it is possible to provide an image stabilizing apparatus, an optical apparatus using the image stabilizing apparatus, and a driving apparatus that reduce the influence of backlash and the like without increasing their sizes.

Further features of the present invention will become apparent from the following description of exemplary embodiments with reference to the attached drawings.

BRIEF DESCRIPTION OF THE DRAWINGS

FIG. 2A is a front view illustrating the image stabilizing apparatus 100 in Example 1 of the present invention. FIG. 2B is a bottom view of the same. FIG. 2C and FIG. 2D are cross-sectional views of the same, respectively. FIG. 2E is an enlarged view (cross-sectional view).

FIG. 8A is a front view of the state where a second fixing member 232 of the image stabilizing apparatus 200 in Example 2 of the present invention is removed. FIG. 8B is a cross-sectional view of the same.

DESCRIPTION OF THE EMBODIMENTS

Preferred embodiments of the present invention will now be described in detail in accordance with the accompanying drawings.

The same members are denoted by the same numerals in each of the figures. Additionally, when a, b and c are added to the numbers of members, it means that there are a plurality of (three in this case) members with similar configurations. When members with similar configurations are not distinguished from each other, only the number of the members is used so as to represent the members.

Example 1

Figure 1:
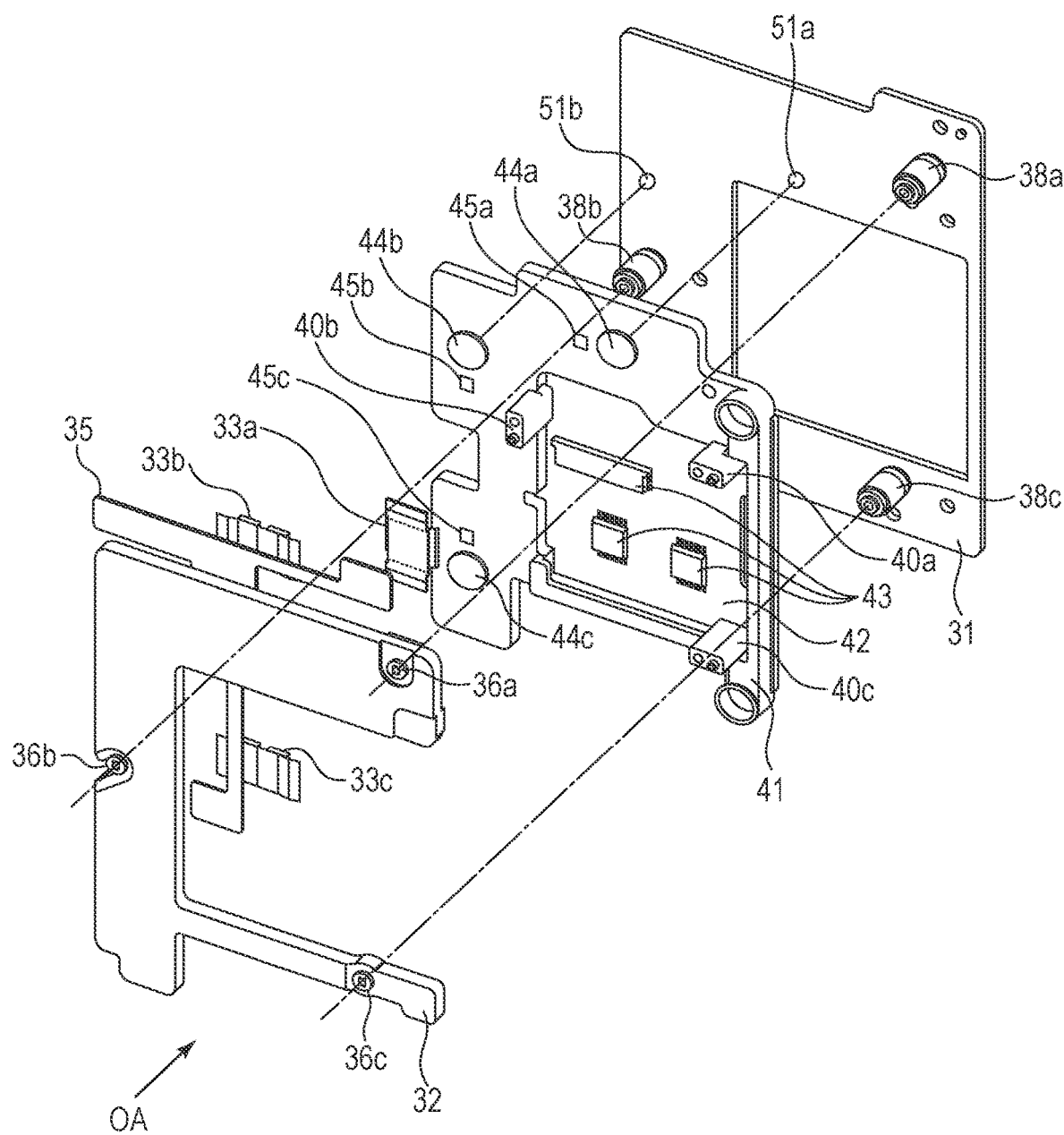
FIG. 1 is an exploded perspective view of an image stabilizing apparatus 100 in Example 1 of the present invention.

FIG. 1 is an exploded perspective view of an image stabilizing apparatus 100 that is a driving apparatus in Example 1 of the present invention. The image stabilizing apparatus 100 of Example 1 is formed by a first fixing member 31, a ball 51, a movable member 41, a driving unit 33, a FPC 35 and a second fixing member 32 in the direction along an optical axis OA. That is, the image stabilizing apparatus 100 of Example 1 is configured such that the movable member 41 is sandwiched between the first fixing member 31 and the second fixing member 32.

FIG. 2A is a front view of the image stabilizing apparatus 100 seen in the direction of the optical axis OA, and FIG. 2B is a bottom view of the same. FIG. 2C is a cross-sectional view taken along a profile line IIC-IIC of FIG. 2A, FIG. 2D is a cross-sectional view taken along a profile line IID-IID of FIG. 2A, and FIG. 2E is an enlarged view near a driving unit 33a surrounded by a circle in the cross-sectional view of FIG. 2C.

In FIG. 2A, three driving units 33a, 33b and 33c (a plurality of vibrators) are each illustrated by a broken line rectangle, and the driving forces a, b and c generated by the driving units 33a, 33b and 33c, respectively, are each illustrated by an arrow. Each of the holes 34a, 34b and 34c is a hole for fixing the first fixing member 31 to a main body of an image pickup apparatus 10 described later. The FPC 35 is a flexible printed circuit board for supplying electric power to the driving unit 33. Then, screws 36a, 36b and 36c, which are fastening members, couple and fasten the first fixing member 31 to the second fixing member 32 via spacer members 37a, 37b and 37c in the direction of optical axis OA. Note that numbers in the thirties in this specification are given to fixing units (members that do not move with respect to the driving for image stabilization).

The image stabilizing apparatus 100 can translates in two directions and perform rotary motion around one axis by generating an appropriate displacement with the driving unit 33. That is, translation in two directions in a flat surface orthogonal to the projection direction of the front view of FIG. 2A, and rotary motion around one axis, which is a rotation axis in the projection direction, are enabled. Since the projection direction is the direction of the optical axis OA, the movable member 41 is movably supported in the flat surface perpendicular to the direction of the optical axis OA. The movable member 41 includes element fixing units 40a, 40b and 40c protruding in the direction of the optical axis OA, and the element fixing units 40a, 40b and 40c each includes a screw hole and a positioning pin for attaching an image sensor 12. Then, it is possible to suppress the influence of camera shake and stabilize an image in the image sensor 12 by appropriately driving the driving unit 33 based on a signal from a shake detection unit 19 illustrated in FIG. 5B described below. Especially, the movable member 41 can move in a direction parallel to an image pickup surface of the image sensor 12 with respect to the first fixing member 31, and rotate around an axis orthogonal to the image pickup surface by vibrating at least one of the three driving units 33a. 33b and 33c.

A substrate 42 is attached to the movable member 41, and implemented electronic components 43 are arranged on this substrate 42. The electronic components 43 send signals to an image processing unit 13 via a FPC (a flexible printed circuit board different from the FPC 35 supplying electric power to the vibration wave actuator) that is not illustrated. Note that numbers in the forties in this specification are given to the moving units (driven members that are moved by the driving for image stabilization).

The configuration of the driving unit 33a is described with reference to FIG. 2E. The driving unit 33a includes a vibration wave actuator (vibrator) formed by a vibrating plate 52a and a piezoelectric element 53, a spring 55a and felt 54a that pressurize the vibration wave actuator, and a slider 44a driven by the vibration wave actuator. Since the other driving units 33b and 33c have configurations similar to the configuration of the driving unit 33a, a description of their configurations is omitted. Note that numbers in the fifties in this specification are given to the members forming a driving part.

The slider 44a is fixed to the movable member 41, and contacts the vibrating plate 52a. On the other hand, the spring 55a is fixed to the second fixing member 32, and the felt 54a is fixed to a surface of the spring 55a. Then, by properly applying voltage to the piezoelectric element 53a via the FPC 35, the vibrating plate 52a generates vibration (ultrasonic vibration) at a frequency in an ultrasonic range, and drives the slider 44a, so as to move the movable member 41.

A ball 51a, which is a support member for movably supporting the movable member 41 with respect to the first fixing member 31, is sandwiched between the first fixing member 31 and the sliders 44a, and guides the slider 44a driven by the vibrating plate 52a. The slider 44a is provided to the movable member 41, that is, the ball 51a is sandwiched between the first fixing member 31 and the movable member 41. Additionally, a plurality of balls 51a, 51b and 51c are arranged between a surface of the movable member 41 and the first fixing member 31, the surface being on the side of the movable member 41 opposite to the side corresponding to a plurality of vibration wave actuators. With the configuration as illustrated in FIG. 2E, the vibrating plate 52a of the vibration wave actuator can be made to contact the slider 44a by an elastic force of the spring 55a with a predetermined pressure.

FIG. 2D illustrates the configuration in which the first fixing member 31 and the second fixing member 32 are coupled to each other. The first fixing member 31 and the second fixing member 32 are coupled to each other via a spacer member 37b forming a cylindrical shape. A narrow diameter portion where the diameter becomes small exists near the middle of the spacer member 37b, and an elastic member 38b is fitted in the narrow diameter portion. Fitting as used herein means that, in the state where the inner diameter of the elastic member 38b before attaching is smaller than the diameter of the spacer member 37b, the elastic member 38b is elastically deformed and attached to the spacer member 37b without gaps. This elastic member 38b forms a so-called mechanical stopper. With such a configuration, movement is restricted even when the movable member 41 is displaced by an impact applied from the outside.

Screw holes 39b are provided in both ends in the longitudinal direction of the spacer member 37b. In one end of the longitudinal direction, the first fixing member 31 is fastened with a screw 36b, in the other end of the spacer member 37b, the spacer member 37b and the second fixing member 32 are fastened with a screw 36b, and the space between the first fixing member 31 and the second fixing member 32 is maintained by interposing the spacer member 37b in this way. By fastening these screws 36b, the spring 55 of the driving unit 33 is elastically deformed to press the vibrating plate 52 against the slider 44. That is, the configuration is adopted in which the second fixing member 32 is fixed to the first fixing member 31, so as to make the vibrating plate 52 and the slider 44 contact each other with a predetermined pressure.

Figure 4A:
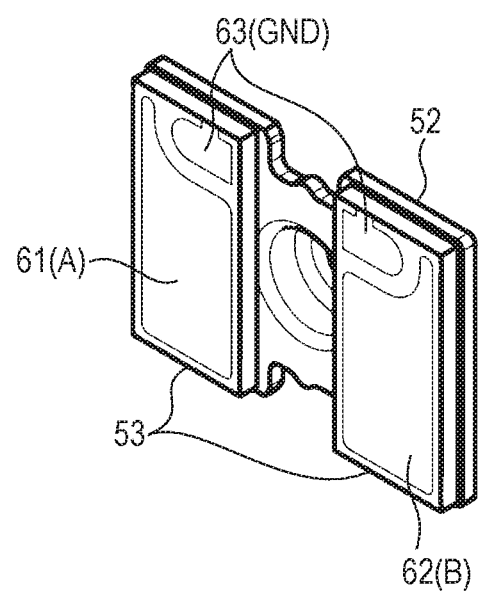
FIG. 4A and FIG. 4B are perspective views of the vibration wave actuator in the present invention, respectively.
Figure 4B:
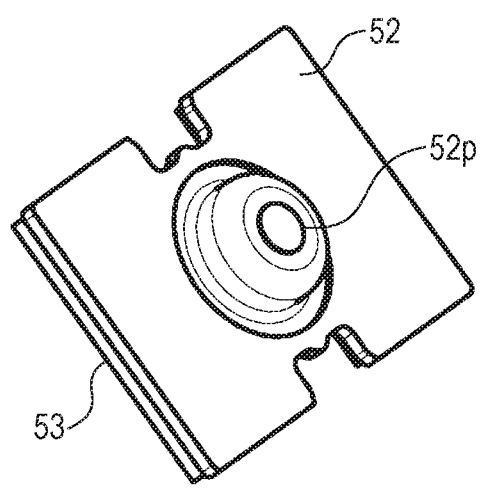

The configuration and operation of the vibration wave actuator are described with reference to FIG. 4A and FIG. 4B. As described above, the vibration wave actuator is formed by the vibrating plate 52 and the piezoelectric element 53. Then, three electrodes 61 (A phase), 62 (B phase) and 63 (GND) are formed in the piezoelectric element 53. The voltage having a frequency for the vibrating plate 52 to excite resonance is applied between the A phase-GND and between the B phase-GND, and the phase difference is given between the voltages applied to the A phase and the B phase, so as to make an output unit 52p, which is a protrusion formed in the vibrating plate 52, to perform elliptic motion. Then, the slider 44 to which the output unit 52p of the vibrating plate 52 contacts can be displaced by this elliptic motion. In the present invention, actuators that directly extract a mechanical vibration in the frequency domain of an ultrasonic wave and perform driving without using an electromagnetic action is called the vibration wave actuator (ultrasonic actuator). As for the detailed configuration and operation of the above-described vibration wave actuator, reference may be made to the discussion of Japanese Patent Application Laid-Open No. 2016-92879, and a detailed description about the operation of the vibration wave actuator of the present invention is omitted.

Figure 3:
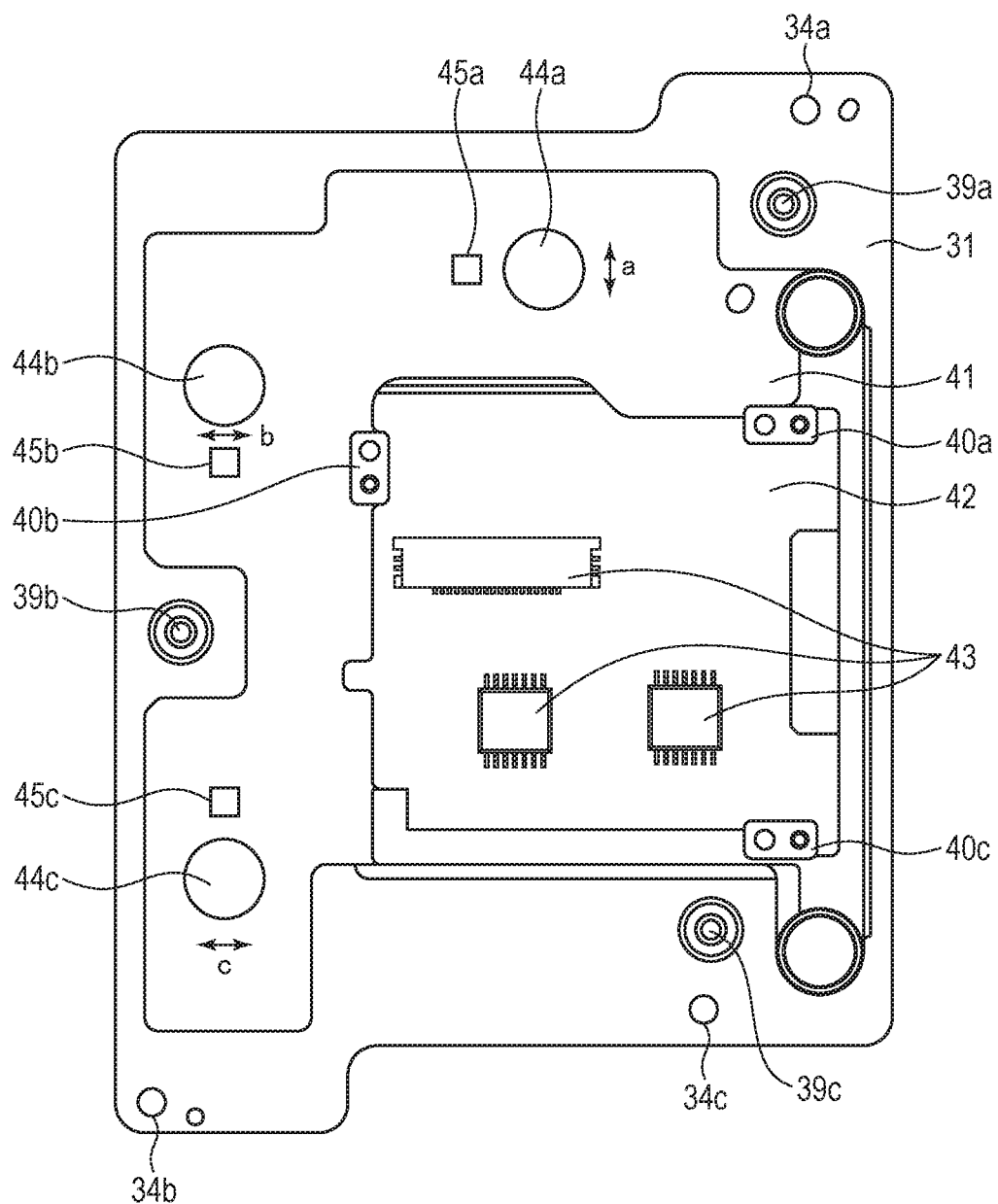
FIG. 3 is a front view of the state where a second fixing member 32, a vibration wave actuator and a FPC 35 of the image stabilizing apparatus 100 in Example 1 of the present invention are removed.

FIG. 3 is a front view in the state where the members that exist closer to the second fixing member 32 than the slider 44 fixed to the movable member 41 are removed, i.e., the state where the second fixing member 32, the FPC 35 and the driving unit 33 are removed. As illustrated in FIG. 3, magnets 45a, 45b and 45c are provided in the movable member 41 near the sliders 44a, 44b and 44c, respectively. Then, each of the magnets 45a, 45b and 45c faces the FPC 35, and a magnetic sensor (a Hall element or the like may be used), which is not illustrated, is provided in the position of the FPC 35 corresponding to each of the magnets 45a, 45b and 45c.

In the control of the image stabilizing apparatus 100 of Example 1, so-called feedback control is performed in which a relative displacement (relative movement) of the movable member 41 and the first fixing member 31 is detected by the magnets 45a, 45b and 45c and the magnetic sensor, and this detection result is compared with a target value. Further, when driving in a specific direction, the vibration wave actuator of a direction that does not contribute to the driving also excites vibration in an upthrust direction (this is also called footstep vibration, etc.). Generally, the vibration in the upthrust direction can be excited by applying the voltage of the same phase between the A phase-GND and between the B phase-GND of FIG. 4A. Specifically, when moving the movable member 41 in the up-and-down direction of FIG. 3, a driving force a in the up-and-down direction is generated by the driving unit 33a, and the other driving units 33b and 33c are made to perform footstep vibration. Further, by performing the feedback control, the movable member 41 moves only in the up-and-down direction.

Referring to FIG. 2E, in the image stabilizing apparatus 100 of Example 1, the rear surface of a contact surface in which the vibrating plate 52a contacts the slider 44a is a guide surface that guides the ball 51a. In the slider 44 requiring a surface hardness, the contact surface that the vibrating plate 52 contacts and the guide surface guiding the ball 51 are collected in the front and rear sides of the same member, and thus the man-hours for surface treatment can be reduced, and the cost can be reduced with such a configuration.

As illustrated in FIG. 1 to FIG. 3, the image stabilizing apparatus 100 of Example 1 has the configuration in which the movable member 41 is sandwiched between the vibrating plate 52 and the plurality of balls 51 (51a, 51b, 51c). Therefore, since the movable member 41 is held by a frictional force even when voltage is not applied to the vibration wave actuator, a locking mechanism for holding the movable member 41 is not required, and the size of the apparatus is not increased. Accordingly, it is possible to provide the image stabilizing apparatus 100 that reduces the influence of backlash and the like without increasing its size.

Additionally, referring to FIG. 2A to FIG. 2E, each of the driving units 33a, 33b and 33c is provided in parallel and with the same configuration. Each of the vibrating plates 52a, 52b (not illustrated) and 52c (not illustrated) is arranged in parallel via each of the springs 55a, 55b (not illustrated) and 55c (not illustrated) from the second fixing member 32, and contacts the sliders 44a, 44b (not illustrated) and 44c (not illustrated) of the movable member 41. That is, the configuration is adopted in which a plurality of vibration wave actuators are provided in parallel between the movable member 41 and the second fixing member 32, so that the plurality of vibration wave actuators are arranged in a flat surface parallel to the moving direction of the movable member 41. Especially, the configuration is adopted in which the output units 52p provided in the vibrating plates 52 of the plurality of vibration wave actuators directly contact the slider 44. With such a configuration, the slider 44 can be driven without interposing other members. That is, it is possible to provide the image stabilizing apparatus 100 that reduces the influence of backlash and the like.

Holes 34a, 34b and 34c for fixing the image stabilizing apparatus 100 to the main body of the image pickup apparatus 10 are provided in the first fixing member 31, and especially, near the holes 34a and 34b, the hole for positioning at the time of fixing the image stabilizing apparatus 100 to the image pickup apparatus 10 is provided. By adopting such a configuration, the position of the movable member 41 can be correctly determined. Then, the arrangement of members from the vibration wave actuator to the image pickup apparatus 10 is in the order of the vibration wave actuator→the movable member 41→the ball 51→the first fixing member 31→the image pickup apparatus 10, and there are few interposing members for positioning the movable member 41. Further, since each of the interposing members is formed only by members that easily allow improvement of part precision, the position of the movable member 41 can be correctly determined. In this way, since a flange back (FB) can be determined only by the movable member 41 (slider 44), the ball 51, and the first fixing member 31, it is possible to eliminate unstable factors in the stacking direction (thickness direction) of the members. That is, the influence by degradation of the felt 54 and the vibrating plate 52 can be eliminated. Although it is generally necessary to correctly determine the position of the image sensor 12 provided in the image stabilizing apparatus 100 with respect to a lens attaching unit (which is a mechanical boundary part with the lens unit 20, and is called a mount) of the image pickup apparatus 10, this is realized by adopting the above-described configuration.

Application Example 1

Figure 5A:
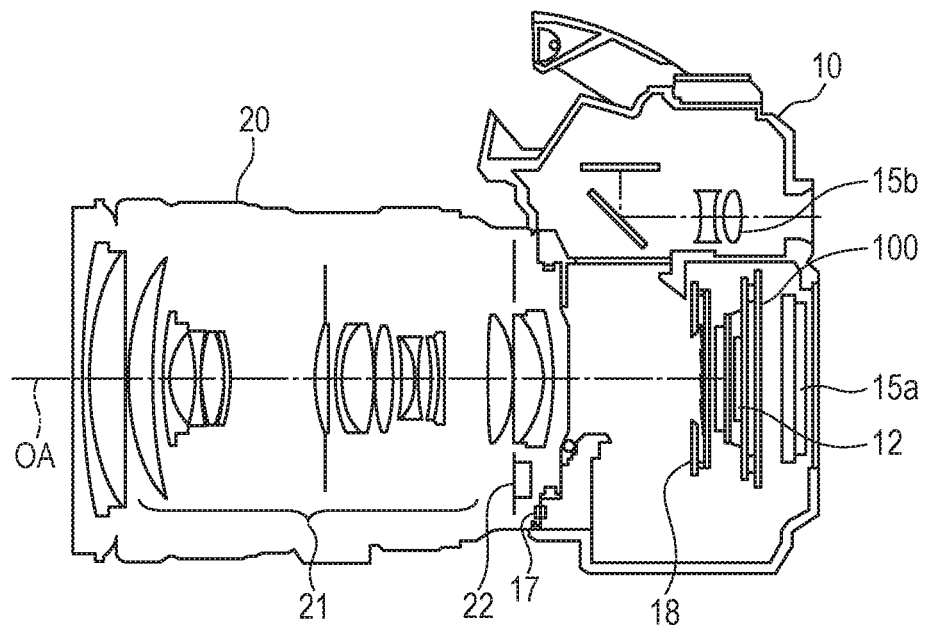
FIG. 5A is a cross-sectional view of a camera system including an image pickup apparatus 10 including the image stabilizing apparatus 100 in Example 1 of the present invention and a lens unit 20.
Figure 5B:
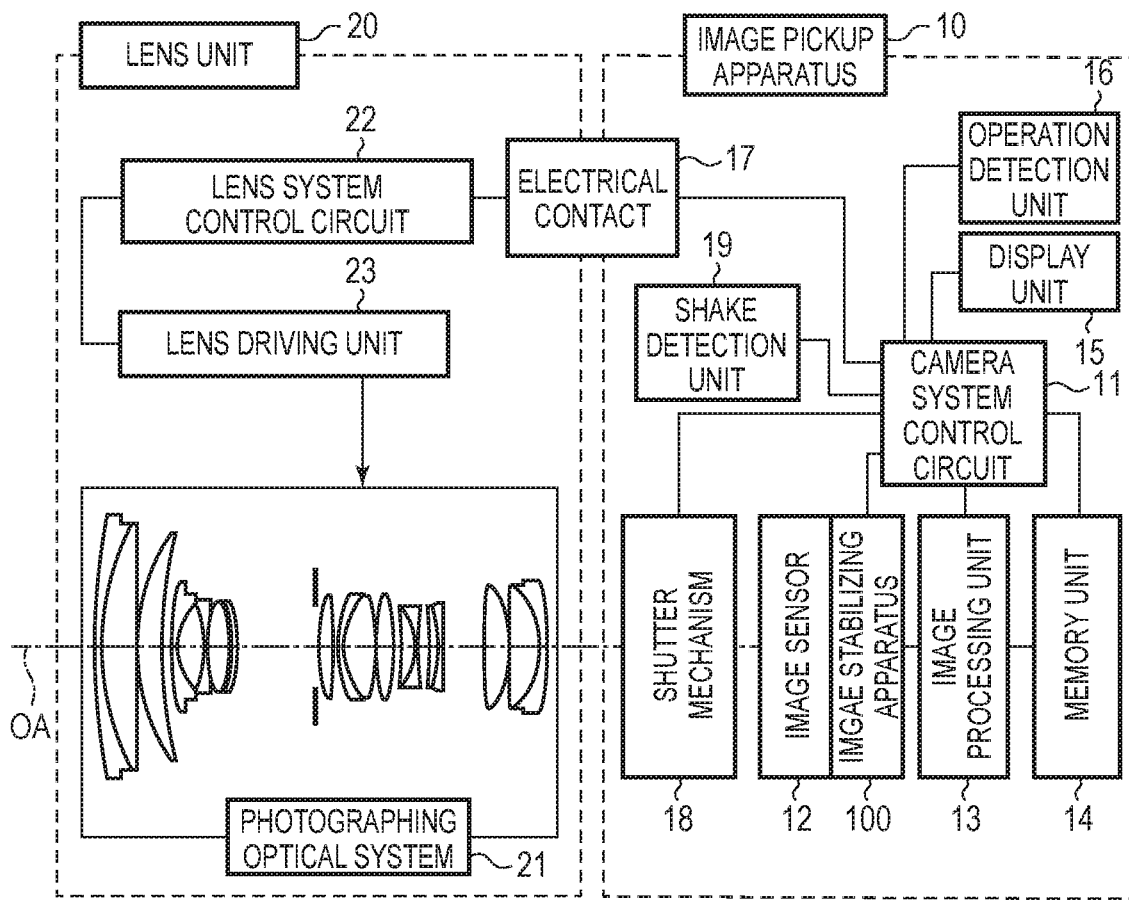
FIG. 5B is a block diagram illustrating an electrical configuration of the camera system.

FIG. 5A is a cross-sectional view of the camera system (optical apparatus) including the image pickup apparatus 10 including the image stabilizing apparatus 100 of Example 1 of the present invention and the lens unit 20, and FIG. 5B is a block diagram illustrating an electrical configuration of the camera system. A camera system includes an image pickup unit, an image processing unit, a record reproducing unit, and a control unit. The image pickup unit includes a photographing optical system 21, a shutter mechanism 18, and an image sensor 12, and the image processing unit includes an image processing unit 13. Additionally, the record reproducing unit includes a memory unit 14, and a display unit 15 (the display unit 15 includes a rear display apparatus 15a and an EVF 15b). The control unit includes a camera system control circuit 11, an operation detection unit 16, a shake detection unit 19, the image stabilizing apparatus 100, a lens system control circuit 22, and a lens driving unit 23. The lens driving unit 23 drives a focus lens (a lens forming a part of the photographing optical system 21), an aperture, and the like.

The image pickup unit is an optical processing system that performs imaging of the light from an object onto an image pickup surface of the image sensor 12 via the photographing optical system 21. The surface on which the image of an object is formed via the photographing optical system 21 is called an imaging surface, and the image sensor 12 is arranged in the imaging surface. Since a focus evaluation quantity/a signal with a suitable light exposure amount are obtained from the image sensor 12, by appropriately adjusting the photographing optical system 21 based on this signal, the image sensor 12 is exposed to the object light of an appropriate amount of light, and the imaging of a subject image is performed near the image sensor 12.

The image processing unit 13 includes an A/D converter, a white balance adjustment circuit, a gamma correction circuit, an interpolation arithmetic circuit, and the like, and can generate an image for record. The color interpolation processing unit is provided in this image processing unit 13, and generates a color image by conducting color interpolation (demosaicing) processing from a Bayer array signal. Additionally, the image processing unit 13 compresses images, moving images, sound and the like by using a predetermined method.

The memory unit 14 includes an actual storage unit. The camera system control circuit 11 performs outputting to the storage unit of the memory unit 14, and displays (reproduces) an image to be presented to a user on the display unit 15.

The camera system control circuit 11 generates and outputs a timing signal, etc., at the time of an image pickup. Each of the image pickup unit, the image processing unit, and the record reproducing unit is controlled in response to an external operation. For example, the operation detection unit 16 detects the pressing down of a shutter release button that is not illustrated, and controls the driving of the image sensor 12, the operation of the image processing unit 13, compression processing, and the like. Further, the display unit 15 controls the state of each segment of an information display apparatus displaying information. Additionally, the rear display apparatus 15a is a touch panel, and is connected to the operation detection unit 16.

The adjusting operation of the photographing optical system 21 is described. The image processing unit 13 is connected to the camera system control circuit 11, and the appropriate focal position and aperture position are found based on the signal from the image sensor 12. The camera system control circuit 11 issues an instruction to the lens system control circuit 22 via an electric contact 17, and the lens system control circuit 22 appropriately controls the lens driving unit 23.

The image pickup apparatus 10 includes a shutter mechanism 18, and can perform exposure control according to the instruction from the camera system control circuit 11. Additionally, the image pickup apparatus 10 includes a shake detection unit 19 and the image stabilizing apparatus 100, and can reduce the influence of the so-called camera shake. That is, when performing camera shake compensation, the camera shake correction is performed by displacing the image sensor 12 provided in the image stabilizing apparatus 100 based on a signal obtained from the shake detection unit 19 (a gyro sensor as an example), and thus it is possible to perform photographing with reduced influence of camera shake.

Although the image stabilizing apparatus in a broad sense includes the shake detection unit 19, the camera system control circuit 11 managing the control, and the image stabilizing apparatus 100 that is the mechanism for image stabilization, since the present invention is especially characterized by the configuration, the word "image stabilizing apparatus" is used as a term for indicating the configuration for image stabilization.

Example 2

Figure 6:
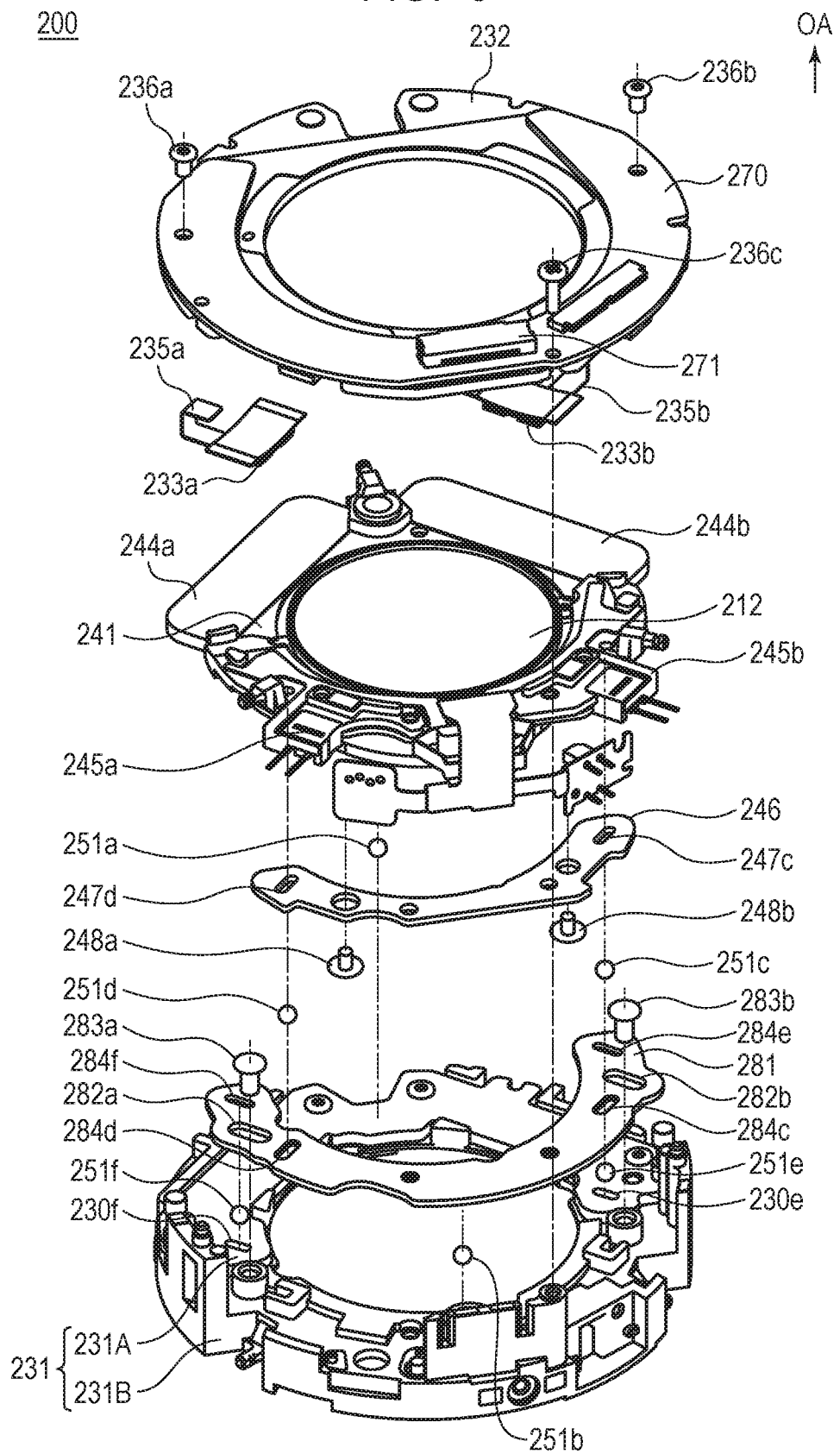
FIG. 6 is an exploded perspective view of an image stabilizing apparatus 200 in Example 2 of the present invention.

FIG. 6 is an exploded perspective view of an image stabilizing apparatus 200 that is the driving apparatus in Example 2 of the present invention. The image stabilizing apparatus 200 of Example 2 is formed by a first fixing member 231, a ball 251, an anti-roll plate 281, a ball 251, a guide plate 246, a movable member 241, a driving unit 233, a FPC 235, and a second fixing member 232 along the direction of the optical axis OA. As in Example 1, the image stabilizing apparatus 200 of Example 2 has the configuration in which the movable member 241 is sandwiched between the first fixing member 231 and the second fixing member 232. In Example 2, the first fixing member 231 is formed by two members, i.e., a resin member 231B, which is a molded piece of resin, and a metal plate 231A. When handling the resin member 231B and the metal plate 231A collectively, they are represented as the first fixing member 231.

In the description of Example 2, the numbers to which 200 is added are given to members with the same functions as those in Example 1. Note that, while the object to be displaced in image stabilization in Example 1 is the image sensor 12 that is an optical element, in Example 2, an image stabilizing lens 212 is attached to a lens of the optical member (optical element) that is different in respect of the function of image pickup, but is identical in respect of displacement in image stabilization. That is, the movable member 241 of Example 2 holds the image stabilizing lens 212.

Figure 7A:
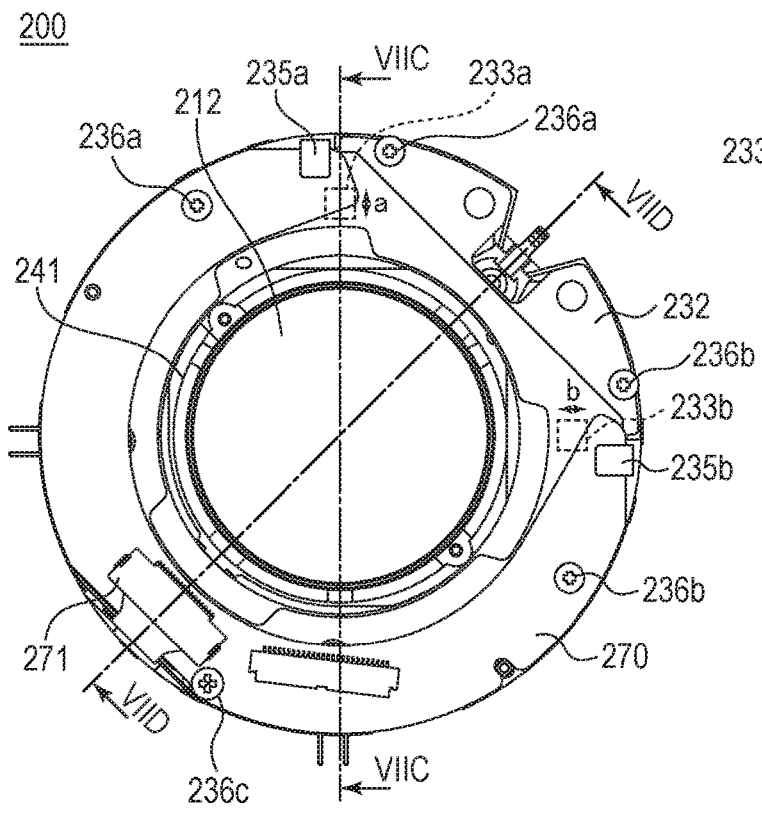
FIG. 7A is a front view illustrating the image stabilizing apparatus 200 in Example 2 of the present invention.
Figure 7C:
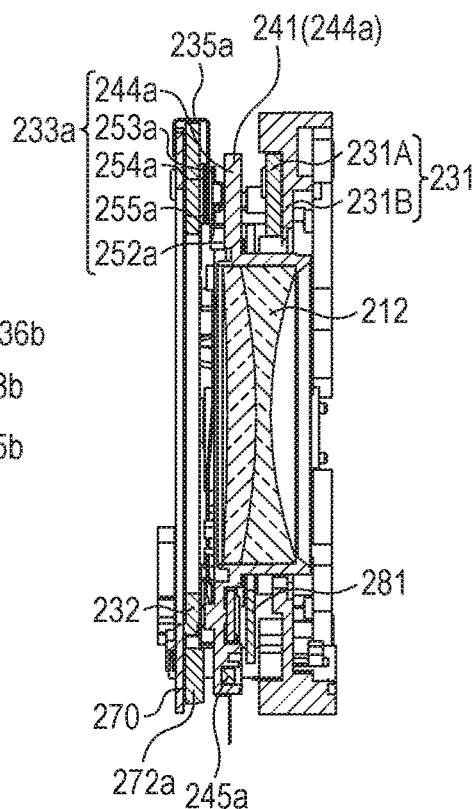
FIG. 7C and FIG. 7D are cross-sectional views of the same, respectively.
Figure 7B:
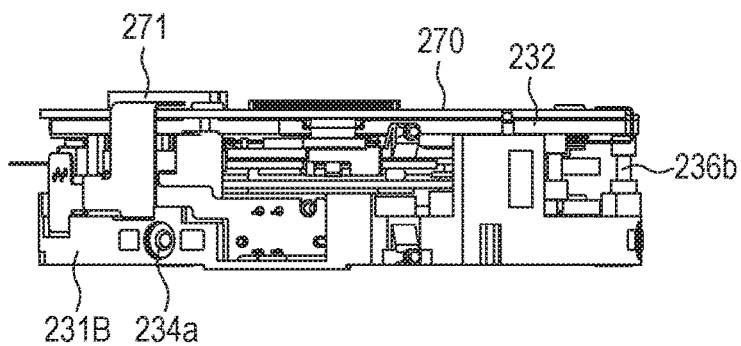
FIG. 7B is a bottom view of the same.
Figure 7D:
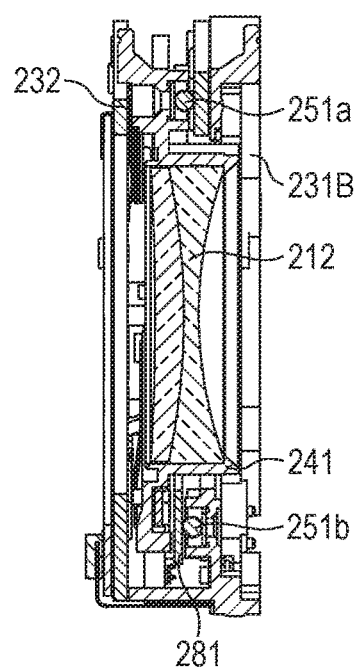

FIG. 7A is a front view of the image stabilizing apparatus 200 seen in the direction of the optical axis OA, and FIG. 7B is the bottom view of the same. FIG. 7C is a cross-sectional view taken along a profile line VIIC-VIIC of FIG. 7A, and FIG. 7D is a cross-sectional view taken along a profile line VIID-VIID of FIG. 7A.

In FIG. 7A, two driving units 233a and 233b (a plurality of vibrators) are each illustrated by a broken line rectangle, and driving forces a and b generated by the driving units 233a and 233b, respectively, are each illustrated by an arrow. In FIG. 7B, a hole 234a provided in the resin member 231B is a hole for fixing the first fixing member 231 to the main body of a photographing optical system 21 described below. Although only one hole 234a is illustrated in FIG. 7B, other holes are further provided in two places so as to equally divide a circumference direction into equal parts each corresponding to 120 degrees. FPC 235a and 235b are flexible printed circuit boards for supplying electric power to the driving units 233a and 233b. Then, screws 236a, 236b and 236c, which are fastening members, couple and fasten the metal plate 231A forming the first fixing member 231 to the second fixing member 232 in the direction of the optical axis OA.

The image stabilizing apparatus 200 can perform translating motion in two directions by generating an appropriate displacement by the driving unit 233. That is, the difference between the mechanisms of the image stabilizing apparatus 200 of Example 2 and the image stabilizing apparatus 100 of Example 1 is that the translating motion is performed only in a flat surface perpendicular to the optical axis OA, since the image stabilizing apparatus 200 driving the image stabilizing lens 212 is in a second degree of freedom, which does not require rotation. The configuration for restricting rotary motion is described below.

The movable member 241 includes two light emitting elements 245a and 245b. Then, referring to FIG. 7C, position detection sensors 272a and 272b (not illustrated) are provided in a control board 270 fixed to the second fixing member 232, so as to face the light emitting elements 245a and 245b, respectively, after assembly. One-dimensional PSDs or the like can be used for the position detection sensors 272a and 272b. Accordingly, the position of the movable member 241 can be detected, and the so-called feedback control can be performed. Note that a connector 271 is installed in the control board 270.

The configuration of the driving unit 233a is described with reference to FIG. 7C. The driving unit 233a of Example 2 has a configuration almost equivalent to that of Example 1. The driving unit 233a includes a vibration wave actuator formed by a vibrating plate 252a and a piezoelectric element 253a, a spring 255a and a felt 254a that pressurize the vibration wave actuator, and a slider unit 244a driven by the vibration wave actuator. The movable member 241 of Example 2 also includes a slider function.

The slider unit 244a is integrated with the movable member 241, and contacts the vibrating plate 252a. On the other hand, the spring 255a is fixed to the second fixing member 232, and the felt 254a is fixed to a surface of the spring 255a. Then, by properly applying voltage to the piezoelectric element 253a via the FPC 235a, the vibrating plate 252a generates vibration (ultrasonic vibration) at a frequency in an ultrasonic range, and drives the slider unit 244a, so as to move the movable member 241.

Six balls 251a, 251b, 251c, 251d, 251e and 251f are sandwiched between the first fixing member 231 and the movable member 241, and guide the slider unit 244a driven by the vibrating plate 252a. With the configuration as illustrated in FIG. 7C, the vibrating plate 252a of the vibration wave actuator can be made to contact the slider unit 244a by an elastic force of the spring 255a with a predetermined pressure. Note that the FPC 235a is connected to the control board 270.

Each of the balls that the image stabilizing apparatus 200 of Example 2 includes is described with reference to FIG. 6. The ball 251a is sandwiched between a flat surface portion of the movable member 241 and a flat surface portion of the metal plate 231A forming the first fixing member 231. The ball 251b is sandwiched between a flat surface portion of the anti-roll plate 281 and the resin member 231B. The balls 251c and 251d are sandwiched between the guide plate 246 fixed to the movable member 241 and the anti-roll plate 281, and the balls 251e and 251f are sandwiched between the anti-roll plate 281 and the metal plate 231A forming the first fixing member 231.

FIG. 8A is a front view of the state where the second fixing member 232, the FPC 235 and the driving unit 233 are removed, and FIG. 8B is a cross-sectional view take along a profile line VIIIB-VIIIB of FIG. 8A. As illustrated in FIG. 8A, the light emitting elements 245a and 245b are provided in the movable member 241. Referring to FIG. 7C, the light emitting element 245a is arranged so as to face the position detection sensor 272a, and detects a displacement in the up-and-down direction of the movable member 241.

Referring to FIG. 6 and FIG. 7C, in the image stabilizing apparatus 200 of Example 2, the configuration is adopted in which a contact surface on which the vibrating plates 252a and 252b contact the slider units 244a and 244b is separated from a guide surface on which the ball 251a is guided by the movable member 241. That is, the rear surface of the contact surface on which the vibrating plate 252 contacts the slider unit 244 is not the guide surface for guiding the ball 251.

In the image stabilizing apparatus 200 of Example 2, there is a case where the vibration (especially, the vibration that thrusts up not in a guiding direction, but in the direction of the optical axis OA) of the vibration wave actuator may become an issue. In such a case, in the movable member 241, an unnecessary vibration can be suppressed by avoiding mutual overlapping of the contact surface that vibrating plate 252 contacts and the guide surface on which the ball 251 is guided, when seen from the direction of the optical axis OA.

As illustrated in FIG. 6, the image stabilizing apparatus 200 of Example 2 has the configuration in which the movable member 241 is interposed between the vibrating plate 252 and the plurality of balls 251. Therefore, since the movable member 241 is held by a frictional force even when voltage is not applied to the vibration wave actuator, a locking mechanism for holding the movable member 241 is not required, and the size of an apparatus is not increased. Accordingly, it is possible to provide the image stabilizing apparatus 200 that reduces the influence of backlash and the like without increasing its size.

Figure 9:
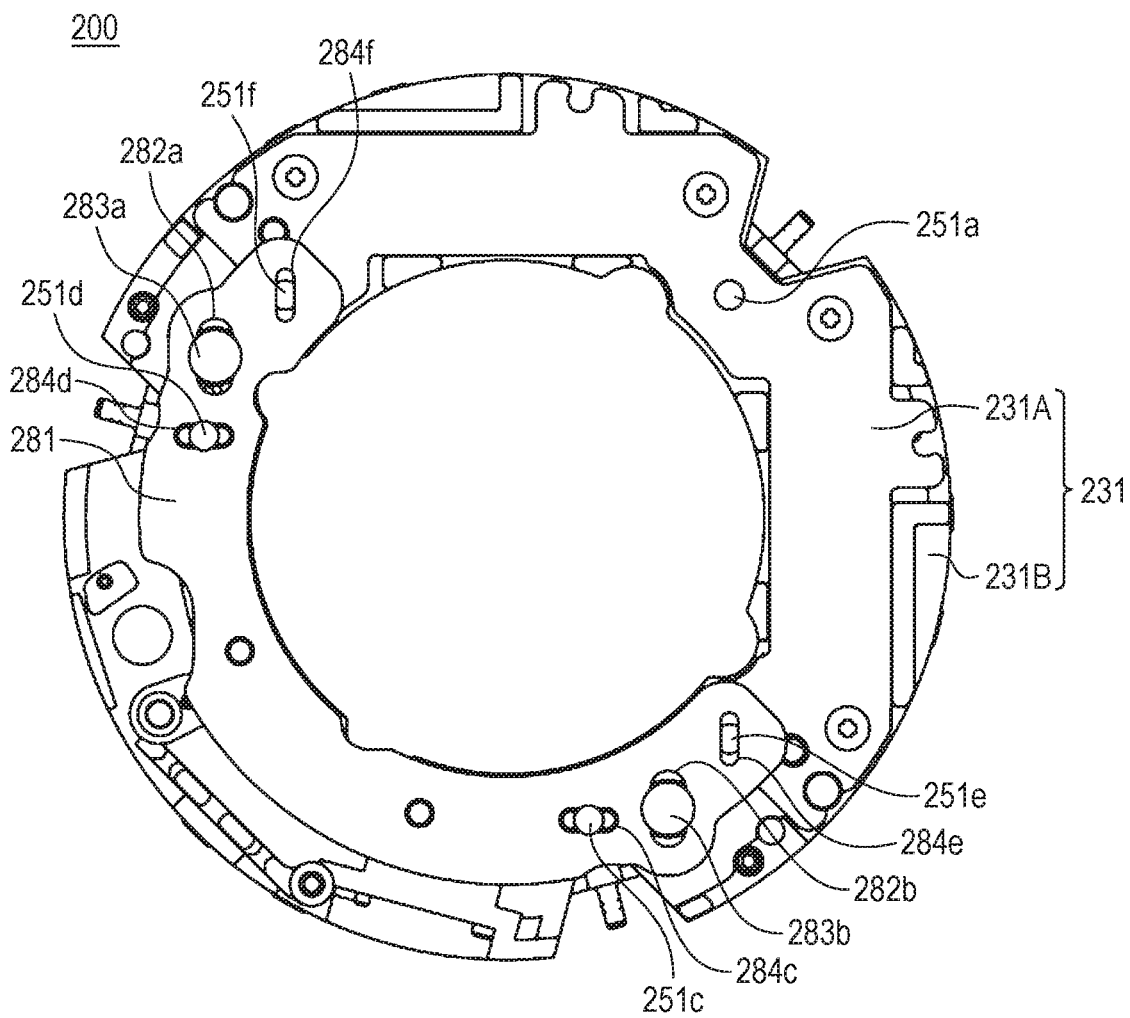
FIG. 9 is a front view of the state where a second fixing member 232 and a movable member 241 of the image stabilizing apparatus 200 in Example 2 of the present invention are removed.
Figure 10:
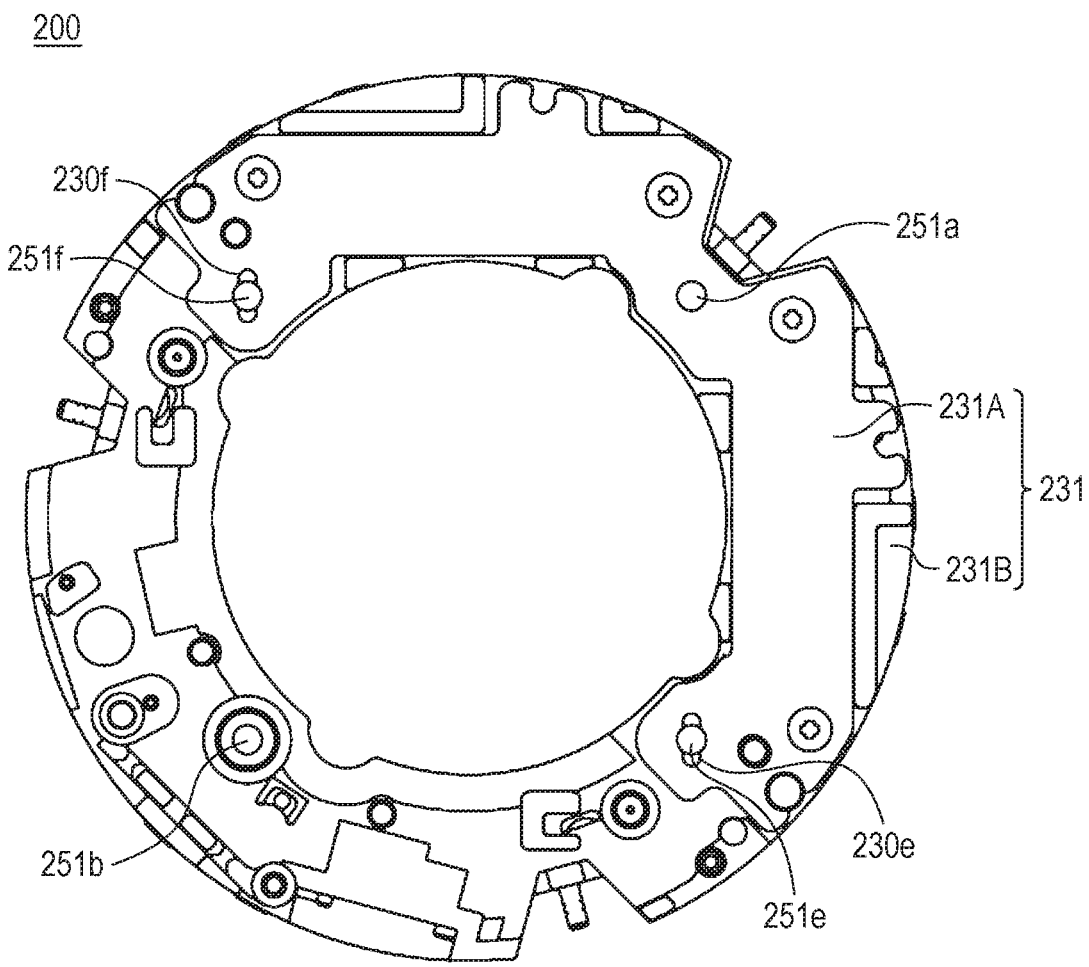
FIG. 10 is a front view of the state where the second fixing member 232, the movable member 241 and an anti-roll plate 281 of the image stabilizing apparatus 200 in Example 2 of the present invention are removed.

FIG. 9 is a front view in the state where the movable member 241 is further removed from FIG. 8A, and FIG. 10 is a front view in the state where the anti-roll plate 281 is further removed. The guidance configuration of the translating motion in a flat surface perpendicular to the optical axis OA is described using FIG. 6, FIG. 9 and FIG. 10. The image stabilizing apparatus 200 of Example 2 of the present invention includes the anti-roll plate 281 that suppresses the rotation of the guide plate 246 fixed to the movable member 241 and of the movable member 241 around the optical axis OA.

The guide plate 246 includes two V grooves 247c and 247d, and is fixed to the movable member 241 with screws 248a and 248b for fixing. Further, the anti-roll plate 281 in the position facing the guide plate 246 includes long holes 282a and 282b extending in the up-and-down direction of FIG. 9. Then, the anti-roll plate 281 is fixed to the metal plate 231A forming the first fixing member 231 in the direction of the optical axis OA by pins 283a and 283b via long holes 282a and 282b in the state where movement of the anti-roll plate 281 is permitted in the up-and-down direction of the figure. Additionally the anti-roll plate 281 includes four V grooves 284c, 284d, 284e and 284f. Then, the metal plate 231A forming the first fixing member includes two V grooves 230e and 230f.

The two V grooves 284c and 284d of the anti-roll plate 281 extend so as to correspond to the two V grooves 247c and 247d of the guide plate 246. Then, the ball 251c is sandwiched between the V groove 247c and the V groove 284c, and the ball 251d is sandwiched between the V groove 247d and the V grooves 284d, respectively. Additionally, the two V grooves 284e and 284f of the anti-roll plate 281 extend so as to correspond to the two V grooves 230e and 230f of the metal plate 231A. Then, the ball 251e is sandwiched between the V groove 284e and the V groove 230e, and the ball 251f is sandwiched between the V groove 284f and the V groove 230f, respectively.

In order to guide the balls 251c and 251d in the same direction as one set, the V grooves 284c and 284d are aligned in the left-and-right direction of FIG. 9 and provided in one flat surface portion of the anti-roll plate 281. Additionally, as illustrated in FIG. 6, the V grooves 247c and 247d are aligned in the same direction and provided in the guide plate 246. Further, in order to guide the balls 251e and 251f in the same direction as one set, the V grooves 284e and 284f are aligned in the up-and-down direction of FIG. 9 and provided in the flat surface portion on the opposite side of the one flat surface portion of the anti-roll plate 281. Additionally, as illustrated in FIG. 10, the V grooves 230e and 230f are aligned in the up-and-down direction of the figure and provided in a surface of the metal plate 231A forming the first fixing member 231.

With such a configuration, the anti-roll plate 281 is guided to translate only in the up-and-down direction with respect to the metal plate 231A forming the first fixing member 231, and the movable member 241 is guided to translate only in the left-and-right direction with respect to the anti-roll plate 281. As a result, the movable member 241 can only perform translating motion in a flat surface perpendicular to the optical axis OA with respect to the metal plate 231A forming the first fixing member 231, and rotary motion is restricted. Note that the ball 251b is provided for balancing the load, and does not restrict the direction. Since these configurations are discussed in Japanese Patent Application Laid-Open No. 2011-158924, a further detailed description is not given here.

When the driving units 233a and 233b illustrated in FIG. 7A generate driving forces a and b, the movable member 241 is driven in the flat surface perpendicular to the optical axis OA by the guiding configuration described in FIG. 9. Additionally, each of the driving unit 233a and 233b is provided in parallel and with the same configuration. The vibrating plates 252a and 252b (not illustrated) are arranged in parallel and contact the slider units 244a and 244b (not illustrated) of the movable member 241 via the respective springs 255a and 255b (not illustrated) from the second fixing member 232. That is, the configuration is adopted in which a plurality of vibration wave actuators are provided in parallel between the movable member 241 and the second fixing member 232. Especially, output units 252p (not illustrated), which are protrusions provided in the vibrating plates 252 of the plurality of vibration wave actuators, directly contact the movable member 241. With such a configuration, the slider unit 244 can be driven without interposing other members. That is, it is possible to provide the image stabilizing apparatus 200 that reduces the influence of backlash and the like.

The holes 234a, 234b (not illustrated), and 234c (not illustrated) for fixing the image stabilizing apparatus 200 to the main body of the lens unit 20 are provided in the resin member 231B forming the first fixing member 231. With such a configuration, the position of the movable member 241 can be correctly determined. Then, the arrangement of members from the vibration wave actuator to the lens unit 20 is in the order of the vibration wave actuator→the movable member 241→the ball 251a→the metal plate 231A→the resin member 231B→the image pickup apparatus 10. Alternatively, it is in the order of the vibration wave actuator→the movable member 241→the guide plate 246→the balls 251c and 251d→the anti-roll plate 281→the balls 251e and 251f→the metal plate 231A→the resin member 231B→the image pickup apparatus 10. In this way, there are few interposing members for positioning the movable member 41. Further, since each of the interposing members is formed only by members that easily allow improvement of part precision, the position of the movable member 241 can be correctly determined. Although the path in the above-described latter order of arrangement is seemingly long, since there are simple planar members and rolling members, it is possible to easily improve the part precision. It is generally necessary to correctly determine the position of the image stabilizing lens 212 provided in the image stabilizing apparatus 200 with respect to an attaching unit (which is a mechanical boundary part with the image pickup apparatus 10, and is called a mount) of the lens unit 20 to the image pickup apparatus 10, this is realized by the above-described configuration.

Application Example 2

Figure 11A:
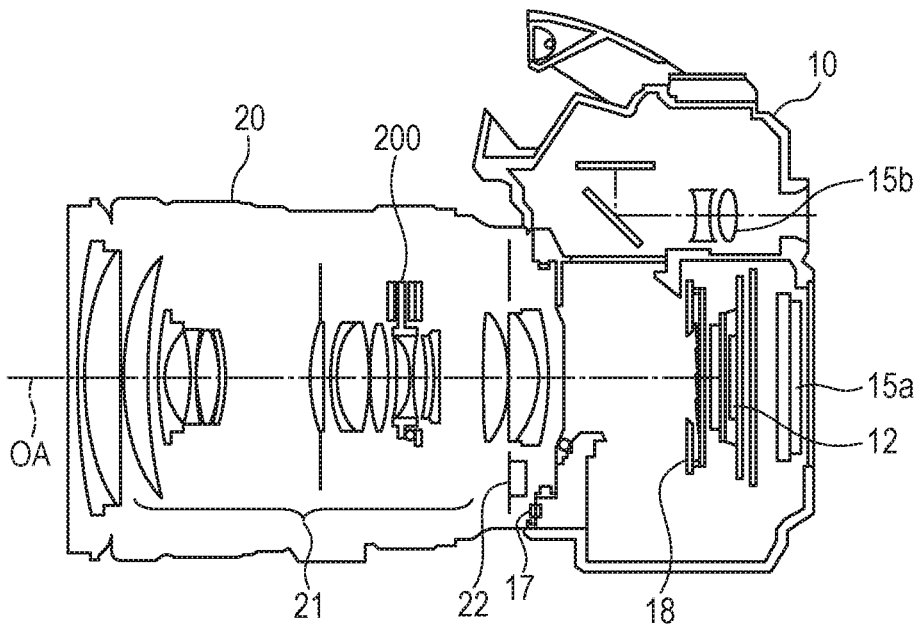
FIG. 11A is a cross-sectional view of a camera system including a lens unit 20 including the image stabilizing apparatus 200 in Example 2 of the present invention and an image pickup apparatus 10.
Figure 11B:
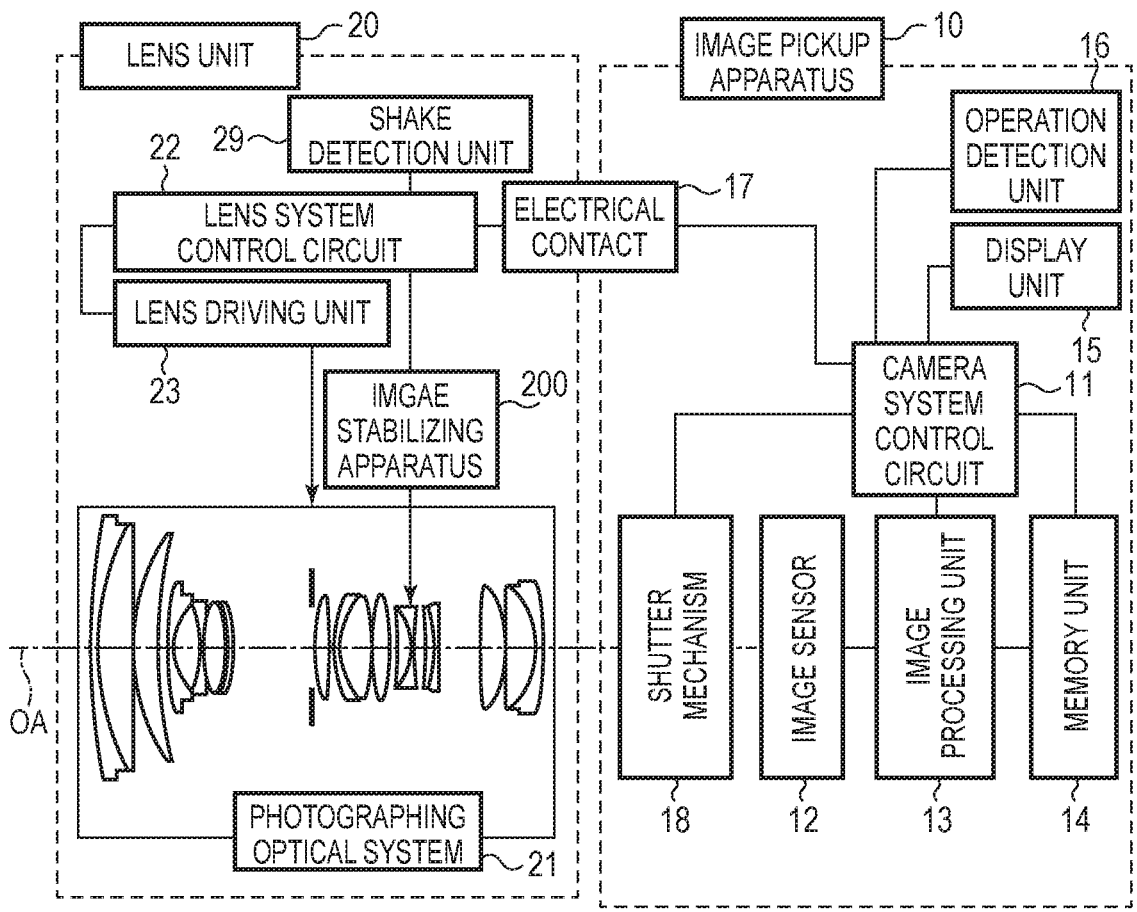
FIG. 11B is a block diagram illustrating an electrical configuration of the camera system.

FIG. 11A is a cross-sectional view of the camera system (optical apparatus) including the lens unit 20 including the image stabilizing apparatus 200 of Example 2 of the present invention and the image pickup apparatus 10, and FIG. 11B is a block diagram illustrating the electrical configuration of the camera system. In FIG. 11A and FIG. 11B, the same numbers are given to those with the same functions as those in FIG. 5A and FIG. 5B. The lens system control circuit 22 can stabilize the image of the image sensor 12, and can suppress the influence of camera shake by moving the image stabilizing lens 212, which is an optical element provided in the image stabilizing apparatus 200, based on the signal from the shake detection unit 29. When performing camera shake compensation, feedback control of the image stabilizing lens 212, which is the optical element, is appropriately performed via the lens system control circuit 22 based on the signal obtained from the image sensor 12. Since the other configurations are the same as those of FIG. 5A and FIG. 5B, a description of them is omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188267, filed Sep. 28, 2017, which is hereby incorporated by reference herein in its entirety.

What is claimed is:
1. An image stabilizing apparatus comprising:
an image sensor;
a first fixing member;
a movable member holding the image sensor, and movably supported in a direction perpendicular to an optical axis;
a ball sandwiched between the movable member and the first fixing member;
a vibrator including a piezoelectric element and a vibrating plate, and moving the movable member;

a slider contacting the vibrating plate, and provided in the movable member;

a spring pressurizing the vibrating plate against the slider; and a second fixing member fixed to the first fixing member so as to make the vibrating plate and the slider contact each other with a predetermined pressure provided by the spring, wherein in a direction of the optical axis the second fixing member is arranged at a position closer to a side of subject than the movable member, and the movable member holds the image sensor so that the image sensor is located closer to the side of subject than the second fixing member.

2. The image stabilizing apparatus according to claim 1, wherein a guide surface of the ball in the movable member and a contact surface on which the vibrating plate contacts the slider are the front and rear sides of the same member.

3. The image stabilizing apparatus according to claim 1, wherein a guide surface of the ball in the movable member and a contact surface on which the vibrating plate contacts the slider are not mutually overlapped when seen from a direction of the optical axis.

4. The image stabilizing apparatus according to claim 1, wherein the slider is fixed to the movable member or a part of the movable member.

5. The image stabilizing apparatus according to claim 1, wherein the first fixing member, the ball, the movable member, and the vibrator are arranged in a direction parallel to the optical axis.

6. The image stabilizing apparatus according to claim 1, wherein the image stabilizing apparatus is connected to a main body via the first fixing member.

7. The image stabilizing apparatus according to claim 1, wherein the vibrator is provided in parallel between the movable member and the second fixing member.

8. The image stabilizing apparatus according to claim 1, wherein the image sensor is moved in a direction perpendicular to the optical axis by relative movement of the vibrating plate and the movable member.

9. The image stabilizing apparatus according to claim 1, further comprising an image stabilizing lens provided in a lens unit.

10. The image stabilizing apparatus according to claim 1, wherein the vibrator is an ultrasonic actuator using vibration at a frequency in an ultrasonic range.

11. An image pickup apparatus using an image stabilizing apparatus comprising:

an image sensor;

a first fixing member;

a movable member holding the optical element, and movably supported in a direction perpendicular to an optical axis;

a ball sandwiched between the movable member and the first fixing member;

a vibrator including a piezoelectric element and a vibrating plate, and moving the movable member;

a slider contacting the vibrating plate, and provided in the movable member;

a spring pressurizing the vibrating plate against the slider; and a second fixing member fixed to the first fixing member so as to make the vibrating plate and the slider contact each other with a predetermined pressure provided by the spring, wherein in a direction of the optical axis the second fixing member is arranged at a position closer to a side of subject than the movable member, and the movable member holds the image sensor so that the image sensor is located closer to the side of subject than the second fixing member.

12. An image pickup apparatus, comprising:

an image sensor;

a fixing member;

a movable member holding the image sensor and movable with respect to the fixing member;

a plurality of vibrators each including a piezoelectric element and a vibrating plate; and a plurality of support members arranged between the movable member and the fixing member, and movably supporting the movable member with respect to the fixing member, wherein the movable member is moved with respect to the fixing member by vibrating at least one of the plurality of vibrators, the plurality of vibrators are arranged in a direction parallel to a moving direction of the movable member, and the plurality of support members are arranged between a surface on an opposite side of a side of the movable member corresponding to the plurality of vibrators and the fixing member, and the movable member holds the image sensor so that the image sensor is located closer to a side of sunject that the plurality of vibrators in a direction of an optical axis.

13. The image pickup apparatus according to claim 12, wherein movement of the movable member with respect to the fixing member in a direction parallel to an image pickup surface of the image sensor, and rotation of the movable member around an axis orthogonal to the image pickup surface are enabled by vibrating at least one of the plurality of vibrators.

14. The image pickup apparatus according to claim 12, wherein the support members are balls.

15. The image pickup apparatus according to claim 12, wherein the vibrators have protrusions, and the protrusions contact the movable member.

* * * * *